(12) United States Patent
Kawasaki

(10) Patent No.: US 6,310,699 B1
(45) Date of Patent: *Oct. 30, 2001

(54) FACSIMILE DEVICE

(75) Inventor: Shinji Kawasaki, Jyoyo (JP)

(73) Assignee: Murata Kikai Kabushiki Kaisha, Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/003,757

(22) Filed: Jan. 7, 1998

(30) Foreign Application Priority Data

Jan. 9, 1997 (JP) .................................................. 9-002452

(51) Int. Cl.$^7$ ................................. H04N 1/00; H04N 1/32
(52) U.S. Cl. .......................... 358/434; 358/408; 358/442; 379/100.12
(58) Field of Search ..................................... 358/407, 468, 358/442, 434, 435, 436; 379/100.01, 100.06, 100.12, 100.15

(56) References Cited

U.S. PATENT DOCUMENTS

| | | | |
|---|---|---|---|
| 4,291,200 | * 9/1981 | Smith | 179/18 BD |
| 4,870,503 | 9/1989 | Miura | 358/256 |
| 4,967,288 | * 10/1990 | Mizutori | 358/425 |
| 4,995,073 | * 2/1991 | Okata | 379/94 |
| 5,157,658 | * 10/1992 | Aria | 370/85.11 |
| 5,170,266 | 12/1992 | Marsh et al. | 358/468 |
| 5,185,784 | * 2/1993 | Nashimoto | 379/94 |
| 5,189,525 | * 2/1993 | Kotani | 358/407 |
| 5,414,528 | 5/1995 | Hatamura | 358/440 |
| 5,465,162 | * 11/1995 | Nishii | 358/442 |
| 5,521,974 | * 5/1996 | Hayashi | 379/111 |
| 5,524,048 | * 6/1996 | Ozawa | 379/100 |
| 5,636,034 | 6/1997 | Ishikawa | 358/434 |
| 5,668,640 | * 9/1997 | Nozawa et al. | 358/434 |

FOREIGN PATENT DOCUMENTS

| | | | |
|---|---|---|---|
| 0853416 | * 7/1998 | (EP) | H04N/1/32 |
| 358187062 | * 11/1983 | (JP) | H04N/1/00 |
| 7-336474 | 12/1995 | (JP) . | |
| 10200721 | * 7/1998 | (JP) | H04N/1/32 |
| 411168523 | * 6/1999 | (JP) | H04N/1/32 |

\* cited by examiner

*Primary Examiner*—Jerome Grant, II
(74) *Attorney, Agent, or Firm*—Armstrong, Westerman, Hattori, McLeland & Naughton, LLP

(57) ABSTRACT

The present invention relates to a facsimile device that is connectable to a plurality of lines. When a facsimile transmission is made, information regarding the transmission source (the facsimile number, the sender's name and the like) is normally transmitted as TSI signals or as a part of the image data (TTI) to the receiver side. According to the present invention,TTI information (line information) can be set for each of a plurality of lines and a particular item of the line information can be selected as desired. Thus, the same line information (TTI information) can be transmitted over all the lines when a simultaneous broadcasting transmission is made using a plurality of lines. In addition, when some lines are used exclusively for transmission and some are used exclusively for reception, any confusion of the TTI on the receiver side will be avoided because misuse of the sender's dedicated transmission lines for reception of a return fax from the original receiving side can be reliably avoided.

5 Claims, 4 Drawing Sheets

FIG. 3

| LINE No. | NAME | PHONE NUMBER |
|---|---|---|
| 1 | AAA – Co. | 075 – AAA – AAAA |
| 2 | BBB – Co. | 075 – BBB – BBBB |
| 3 | CCC – Co. | 075 – CCC – CCCC |
| ⋮ | ⋮ | ⋮ |

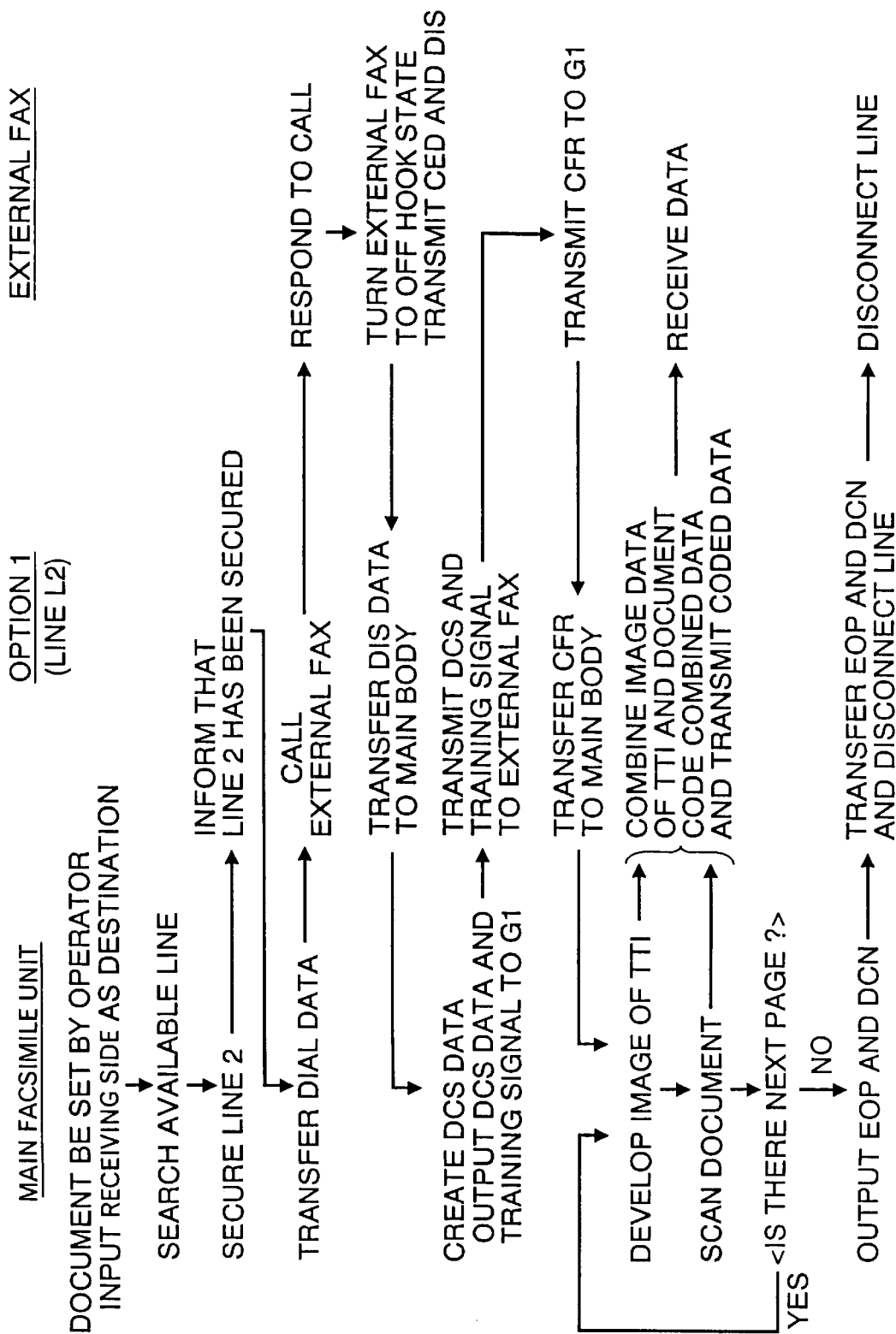

FACSIMILE DEVICE

BACKGROUND OF THE INVENTION

1. Technical Field

The present invention relates to a facsimile device that can be connected to a plurality of lines and can transmit image data with TTI (Transmit Terminal Identifier) such as a sender's name, phone number and date/time of transmission to a receiver side.

2. Background Art

Facsimile devices can be functionally improved by being provided with communication ports, line units and the like to their main facsimile unit such that they can be connected to a plurality of lines. In the case of such facsimile devices, communication may be carried out during transmission by simply utilizing lines not in use. Communication may also be carried out by allocating each line to a different receiving side or by using separate lines for transmission and reception such that the processing efficiency of the facsimile communication is enhanced.

Further, such facsimile devices as described above may be provided with a simultaneous broadcasting communication function such that they can transmit the same contents to a plurality of third parties simultaneously through a plurality of lines. This simultaneous broadcasting communication makes the broadcasting process efficient because a plurality of lines are simultaneously used during the process.

In facsimile communication in general, TTI (Transmit Terminal Identifier) information such as the phone number of the used line, the sender's name, the date/time of transmission and the number of transmitted pages is attached to the header of the document data and transmitted so that the TTI is printed on the receiver's side at the top end of each page of the document. The receiving side can then refer to the phone number of the TTI of the received facsimile data when it attempts to make a facsimile transmission back to the sender.

However, when each of a plurality of lines (each line has a different phone number, of course) is allocated to a different receiving side, if the simultaneous broadcasting communication described above is carried out using the plurality of lines simultaneously, there is a possibility that each receiving side receives a "different" phone number of another line (that is, a phone number of another line that is not allocated to the receiver) as the TTl when the TTI is printed out. If this happens, the receiving side is likely to refer to this "different" phone number and use that another line when it transmits facsimile data back to the sender. This may cause a serious confusion for the information control system of the sender side because the receiving side is then using a line that it is not supposed to use.

Similarly, when the facsimile device on the sender side distinguishes the lines used exclusively for transmission from those used exclusively for reception, if facsimile data is received over the lines used exclusively for transmission, due to the confusion described above, the processing efficiency of the facsimile communication as a whole may be significantly lowered.

SUMMARY OF THE INVENTION

The present invention is conceived in order to solve the aforementioned problems, and its object is to propose a facsimile device as below described. In a facsimile communication such as a simultaneous broadcasting communication in which a plurality of lines are used, the facsimile device of the present invention selects a predetermined phone number (such as a phone number of a line to which the facsimile device itself is connected, a phone number selected by an operator, or a phone number of a line used exclusively for reception) as the phone number to be transmitted as the TTl to the receiving side, regardless of which line is used for the transmission to the receiving side. As a result, if each line is pre-allocated to a particular receiving side on the sender side, its information control system is not disturbed. Also, if a simultaneous broadcasting communication is carried out by simultaneously using a plurality of lines, any confusion on the TTI can be avoided. In addition, even when the facsimile device on the sender side uses separate lines (lines dedicated for transmission and those dedicated for reception), a high processing efficiency during the facsimile communication can always be assured.

As a first aspect of the present invention, a facsimile device that is connectable to a plurality of lines includes: means for storing line information that identifies each of a plurality of lines; means for selecting the predetermined line information from the stored line information when image data is transmitted; and means for transmitting the selected line information along with the image data to a receiving side.

As a second aspect of the present invention, the facsimile device includes a main facsimile unit and one or more line-increase units. Each line-increase unit is provided for connecting a line to the main facsimile unit. Both the main facsimile unit and the line-increase units each include line control means, a modem and communication control means.

In the first and second aspects of the present invention, when a facsimile communication is carried out by using either a plurality of lines to which the main facsimile unit can be connected or by using a plurality of lines to which the main facsimile unit and the line-increase units can be connected, a phone number with information identifying the line that is used, for example, a phone number set as the default sending number, a phone number dedicated for reception or a phone number selected by an operator is selected and transmitted with image data to the receiving side.

Therefore, when the reception side makes a facsimile transmission back to the original sender referring to the (TTI) information, regardless of which line was used for the facsimile data transmission from the sender to the receiver, the facsimile data from the receiver side can always be received by the sender over a line which the sender wants to use for reception (such as a line pre-allocated to the receiver or a line dedicated for reception).

As a third aspect of the facsimile device of the present invention, the device further includes means for making a simultaneous broadcasting communication to a plurality of third parties by using some or all of a plurality of lines. The device can thus transmit the same line information along with the image data to each of the receiving devices during a simultaneous broadcasting communication.

In short, according to the facsimile device of the present invention, when it carries out simultaneous broadcasting communication either by using a plurality of lines that is connectable to the main facsimile unit or by using a plurality of lines that is connectable to its main facsimile unit and line-increase units, it can transmit the same phone number along with the data to be transmitted to a plurality of the receiving devices regardless of which and how many lines were used for the simultaneous broadcasting communication.

As a result, it is possible to join the same phone number with the same image data and send that combined data to each receiving side when conducting simultaneous broadcast communication. Due to this, any possible confusion that might occur if the receiver side did not get the proper (predetermined) phone number can be avoided.

Some facsimile devices of the prior art have proposed an arrangement where a plurality of user names and phone numbers are pre-memorized such that one of the names and its corresponding phone number can be selected and used as the TTI. However, all such conventional devices are designed to be connected to only one line and do not mention how they control the TTI when they send data to a plurality of receiver devices simultaneously using a plurality of lines (in the case of a simultaneous broadcasting communication, for example).

The facsimile device of the present invention, conversely, can always send a pre-selected, correct TTI to each receiver regardless of which and how many lines are used. Therefore, the TTI control on the sender side is never disturbed and any confusion on the TTI can be avoided.

BRIEF DESCRIPTION OF THE ACCOMPANYING DRAWINGS

FIG. 3 shows an example of the memory state of a phone number table as line information that is included in TTI (Transmit Terminal Identifier).

FIG. 4 is a flow chart of a communication procedure of the facsimile device of the present invention.

DETAILED DESCRIPTION OF THE PREFERRED EMBODIMENTS

Figure 1:
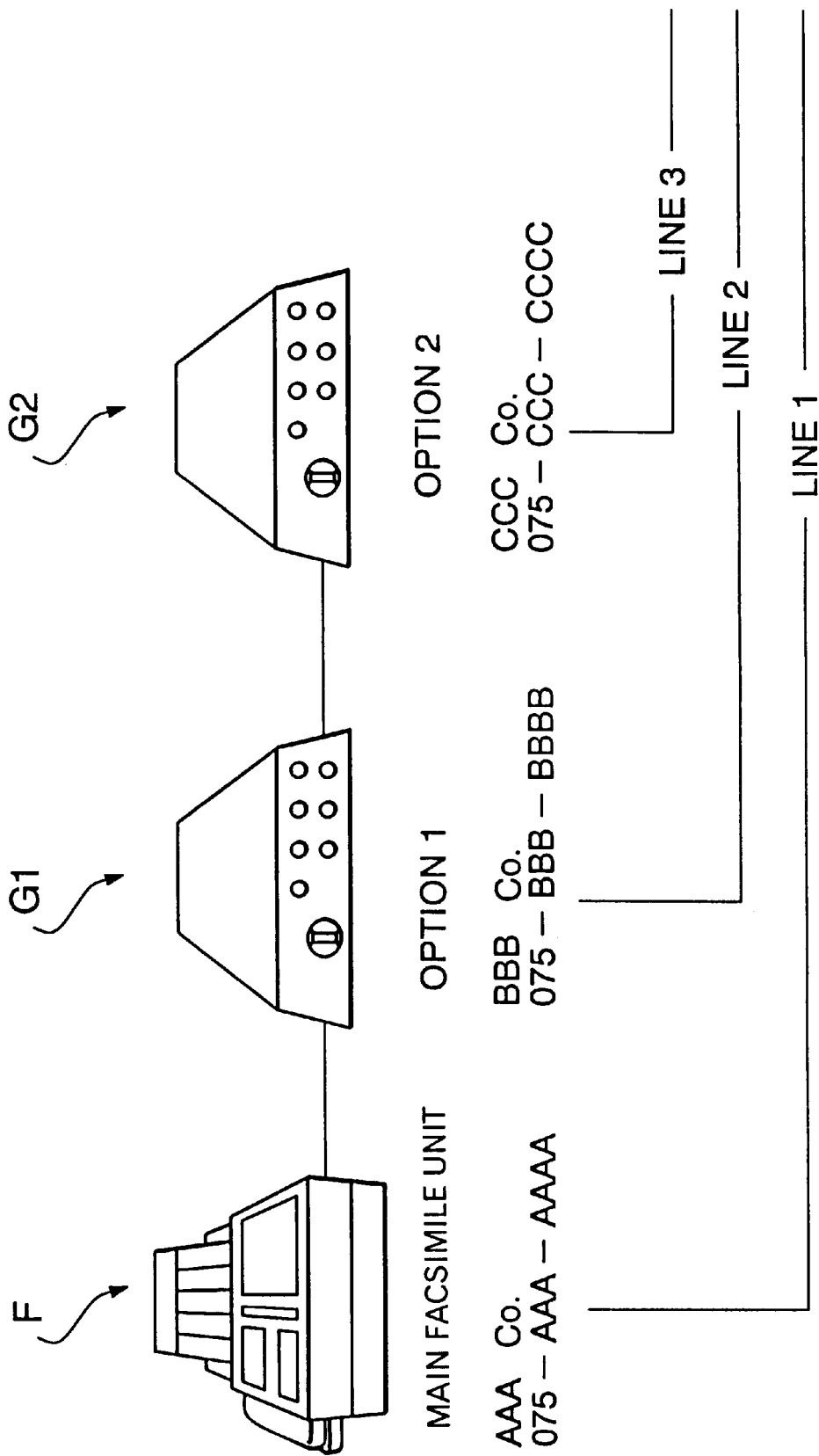
FIG. 1 is a schematic diagram showing the structure of a facsimile device of the present invention.
Figure 2:
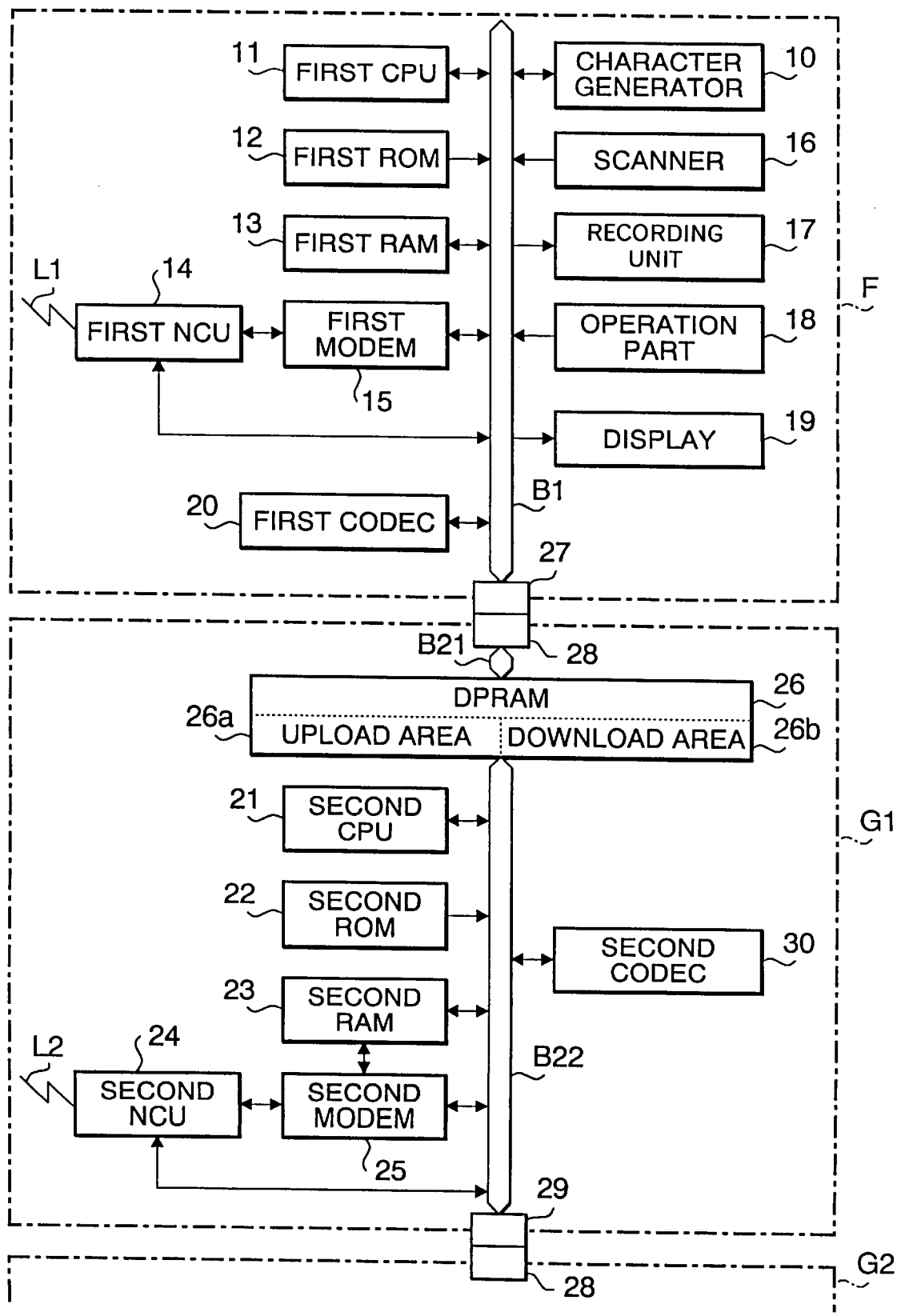
FIG. 2 is a block diagram showing the internal structure of a facsimile device of the present invention.

FIG. 1 is a schematic diagram showing the structure of a facsimile device of the present invention. FIG. 2 is a block diagram showing the internal structure of a facsimile device of the present invention.

The main facsimile unit F can be provided with line units such that the number of lines connectable to the main facsimile unit F is increased. In the present embodiment, two line units G1 (option 1), G2 (option 2) are further provided to the main facsimile unit F. The facsimile device F, the line unit G1 and the line unit G2 are each connectable to a corresponding line (LINE 1, LINE 2, LINE 3), respectively.

Each part of the facsimile device main facsimile unit F will be described hereinbelow.

A CPU 11 controls each of the hardware parts of the main facsimile unit F over a bus B1 and executes the software for coding, decoding, communication procedures and the like.

A character generator 10 generates font data for converting character data (coded according to ASCII code, for example) into image data for display.

A first ROM 12 stores software required to operate the main facsimile unit F. A first RAM 13 includes SRAM or a flash memory and memorizes temporary data that is created during the execution of the software. The RAM 13 further stores a table, as shown in FIG. 3, which includes line information comprising the TTI such as the sender's name and phone number. The line information is stored as coded data, ASCII for example, for each line number, identifying each line that can be connected to the main facsimile unit F or the line unit G1 or the line unit G2.

The first NCU 14 carries out connection/disconnection of analog line L1 (LINE 1). A modem 15 converts digital signals to analog signals for use over telephone lines and converts analog signals received over the LINE L1 to digital signals.

A scanner 16 scans a document by CCD or the like and outputs black and white binary image data. A recording unit 17 includes an electrophotographic printer and records image data received from other facsimile devices G3, G4.

An operation part 18 includes quick dial keys, one touch-dial keys, function keys of various types such as a broadcasting communication key, as well as a dial pad necessary for operation of the facsimile device.

A display 19 displays image data and/or the operational state of the facsimile device.

A first CODEC 20 functions as an encoder for performing MH MR redundancy reduction of black and white binary image data and also functions as a decoder for restoring the redundancy-reduced data to the original image data.

In addition, a connector 27 is provided for connecting the line unit G1.

The line unit G1 and the line unit G2 share a similar structure. The line unit G1 is connected to the downstream side of the facsimile device F and the line unit G2 is connected to the downstream side of the line unit G1.

The line unit G1 can be connected to the facsimile device (the main facsimile unit) F by way of a connector 28 and the line unit G2 can be connected to another line unit by way of another connector 28. The connector 28 is connected to a DPRAM (Dual Port RAM) 26 over a bus B21.

The DPRAM 26 is provided with an upload area 26a that is a data I/O port for inputting/outputting data from the downstream side to the upstream side, and a download area 26b that is a data I/O port for inputting/outputting data from the upstream side to the downstream side. Data received from the line unit on the downstream side is temporarily stored in the upload area 26a, and the option board number (the information for identifying the line unit) that is written into the upload area 26a with the data is checked. When the data is determined not to be addressed to the line unit it is currently using, the data is transferred to the facsimile device main unit F (or the line unit) further upstream. Further, data received from the main facsimile unit F (or the line unit) on the upstream side is temporarily stored in the download area 26b, and the option board number that is written into the download area 26b with the data is checked. When the data is determined not to be addressed to the line unit it is currently using, the data is transferred to another line unit on further downstream.

Next, each part of line unit G1 will be briefly described.

A second CPU 21 controls each part of the hardware of the line unit G1 over a bus B22 and executes the software for coding, decoding, communication procedures and the like.

A second ROM 22 stores software required for operating the line unit G1. A second RAM 23 is comprised of SRAM or a flash memory and stores temporary data that is generated during the execution of the software.

The second NCU 24 carries out connection/disconnection (release) of analog line L2 (LINE 2). A second modem 25 converts digital signals to analog signals for use over telephone lines and reconverts analog signals received from the line L2 to digital signals.

A second CODEC 30 functions as an encoder for performing MH or MR redundancy reduction of black and white binary image data and also functions as a decoder for restoring the redundancy—reduced data to the original image data.

In addition, the line unit G1 is further provided with a connector 29 for connecting the line unit G2. The connector 29 is connected to DPRAM 26 over a bus B22.

Next, the communication procedure of the facsimile device of the present invention (Recommendation T. 30) will be described based on the flow chart shown in FIG.4.

First, abbreviations used in the charts are described. CFR (Confirmation to receive) signals indicate that the device on the reception side has completed phasing and is now ready to receive at least one page.

CED (Called station identification) indicates that the called station is a non-audio terminal. DIS (Digital identification signal) indicates the standard CCITT (The International Telegraph and Telephone Consultative Committee) capacity. DCS (Digital command signal) indicates digital setting command for the standard function determined according to DIS signals.

EOP (End-of-procedure) represents the end of a whole page of the facsimile information and indicates no further transmission of other documents is to be carried out. After the reception of EOP has been confirmed, the phase E (call release) follows.

DCN represents a disconnection command and indicates the initiation of the phase E (call release). This command does not need any response.

In the actual operation, a document to be transmitted is set on a transmission table (not shown) of the facsimile device main unit F by an operator, and the destination of transmission is entered by means of instruction from the operation part 18, for example, by pushing a quick dial key and then a start key (not shown) or just pushing a one-touch key.

The facsimile device main unit F then searches for an unengaged line among the lines L1–L3. If, as a result, line L2 is found to be available, the main facsimile unit F outputs to the line unit G1 (option 1) both a signal for securing line L2 along with a board number that identifies the line unit G1. When the main facsimile unit F receives from the line unit G1 a signal indicating that the line L2 is secured, it transfers to line unit G1 the receiving side's dialing.

The line unit G1 calls an external facsimile device based on the dialing data received from the facsimile device main unit F. The called (external) facsimile device is turned into an off-hook state indicating the line is engaged in response to the call from the line unit G1. The called facsimile then transmits a CED signal indicating that the terminal is a non-audio terminal and a DIS signal indicating the standard CCITT capacity of the (called) device to the line unit G1.

The line unit G1 then transfers the DIS signal data from the external (called) facsimile device to the facsimile device main unit F.

The facsimile device main unit F then generates DCS data (DCS is a digital setting command for the standard function determined according to the DIS signals) and outputs the data along with a training signal to the line unit G1.

The line unit G1 transmits the DCS data along with the training signals to the external facsimile device.

The external facsimile device transmits CFR signals to the line unit G1, and the line unit G1 transfers the CFR signals received from the external facsimile device to the facsimile device main unit F.

The facsimile device main unit F, along with developing the TTI images like calendar information, page number, the name and the phone number corresponding to the line number (No. 1 for the line L1 in this case) stored in the table of the first RAM 13 by using font information from the character generator 10, scans the pages of the document on the document table one by one and outputs to the line unit G1 the image data that is constituted of the TTI and the scanned document data. The line unit G1 combines the image data of the TTI and the image data of the document of one page content, codes it according to MMR method and transmits the coded data to the external facsimile device.

The facsimile device main unit F outputs the document data one page at a time as with the imaged TTI to the line unit G1 until all the pages are scanned. The line unit G1 then combines the document data and the imaged TTI, codes it according to MMR method and transmits the coded data to the external facsimile device.

When the facsimile device main unit F finishes scanning all the pages of the document, it outputs an EOP signal and a DCN signal to the line unit G1. The line unit G1 transmits the EOP signal and the DCN signal to the external facsimile device and disconnects the line. The external facsimile device that has received these signals also disconnects the line.

In the embodiment described above, the TTI that includes the line information of line L1 is transmitted over line L2. That is, when line L1 is dedicated for reception and lines L2, L3 are dedicated for transmission, the receiving side can always receive the line information of line L1 (not that of line L2) as the TTI from the sender.

In the case of a simultaneous broadcasting communication, a process similar to that described above is carried out for each unengaged line that has been secured. It should be noted that in this case the same phone number is transmitted as the TTI to each of the plurality of receiving side devices. The phone number used as the TTI may be one pre-set as the standard phone number of the facsimile device, or one selected by an operator, or one used exclusively for reception. But the same phone number is transmitted to each of the receiving side facsimile devices.

In the present embodiment, the facsimile device main unit F is provided with the line units G1, G2 such that it can be connected to a plurality of lines. The facsimile device main unit F controls the communication procedure (T. 30), stores the TTI in its RAM and selects a line to be used from the available (unengaged) lines. A different phone number from the line used is transmitted to the receiving side as a part of the TTI. However, the following modifications are also possible.

(1) A modification in which the communication procedure is processed in the line unit that has been additionally provided to the facsimile device main unit.

(2) A modified method of connecting more lines according to which the facsimile device main unit itself is adapted to be connectable with a plurality of lines.

(3) A modification in which the TTI is stored in each line unit. It should be noted that a character generator is to be provided in each line unit in this case.

(4) A modified method of selecting a line to be used according to which such a line is selected in a predetermined order if two or more lines are available (unengaged).

(5) A modification in which all of the available lines are selected when a simultaneous broadcasting communication is carried out.

(6) A modification in which the same phone number data used for the TTI is stored in the data to be transmitted as TSI (Transmitting subscriber identification) and this TSI signal data is transmitted.

It should be noted that the effects similar to those demonstrated in the preferred embodiment can also be obtained in these modifications. In short, when the receiving side makes a facsimile communication with reference to the line information, regardless of which line was used for the facsimile data transmission from the sender to the receiver, the facsimile data from the receiver side can always be received over a line that the sender wants to use for reception such as a line pre-allocated to the receiver or a line exclusively for reception.

In addition, each receiving side can always receive the same TTI (phone number etc.) when a simultaneous broadcasting communication is carried out.

What is claimed is:

1. A facsimile device that is connectable to a plurality of lines comprising:

means for storing line information for each of the lines, the line information containing a plurality of identification data as a transmit terminal identifier, including a plurality of source telephone numbers and names, that respectively identifies each of the lines;

means for selecting one of the identification data from the stored line information when image data is to be transmitted;

means for combining the selected identification data with the image data; and means for transmitting the combined identification and image data to a receiving side.

2. The facsimile device of claim 1, further including a main facsimile unit and one or more line-increase units, each line-increase unit being provided for connecting a line to the main facsimile unit, and each of the main facsimile unit and the line-increase units including line control means, a modem and communication control means.

3. The facsimile device of claim 1 or 2, further including means for making a simultaneous broadcasting communication to a plurality of receiving side devices by using some or all of a plurality of lines, such that the same line information along with image data to be transmitted can be transmitted to each of a plurality of the receiving side devices.

4. A facsimile device connectable to a plurality of lines comprising:

means for storing identification data as a transmit terminal identifier, including a source telephone number, for each of the plurality of lines;

means for combining the identification data for a selected one of the plurality of lines with image data to be transmitted; and means for transmitting the combined identification data and image data on at least two of the plurality of lines to a receiving side, the identification data for said selected one of the plurality of lines identifying said facsimile device as sender.

5. A method for facsimile communication, comprising the steps of:

storing identification data as a transmit terminal identifier, including a source telephone number, for each of a plurality of lines conncectable to a facsimile device;

combining the identification data for a selected one of the plurality of lines with image data to be transmitted; and transmitting the combined identification data and image data on at least two of the plurality of lines to a receiving side, the identification data for said selected one of the plurality of lines identifying said facsimile device as sender.

* * * * *